March 12, 1946.  A. HOFMANN ET AL  2,396,263
WELT TURNING ATTACHMENT
Filed Jan. 29, 1941  8 Sheets-Sheet 4
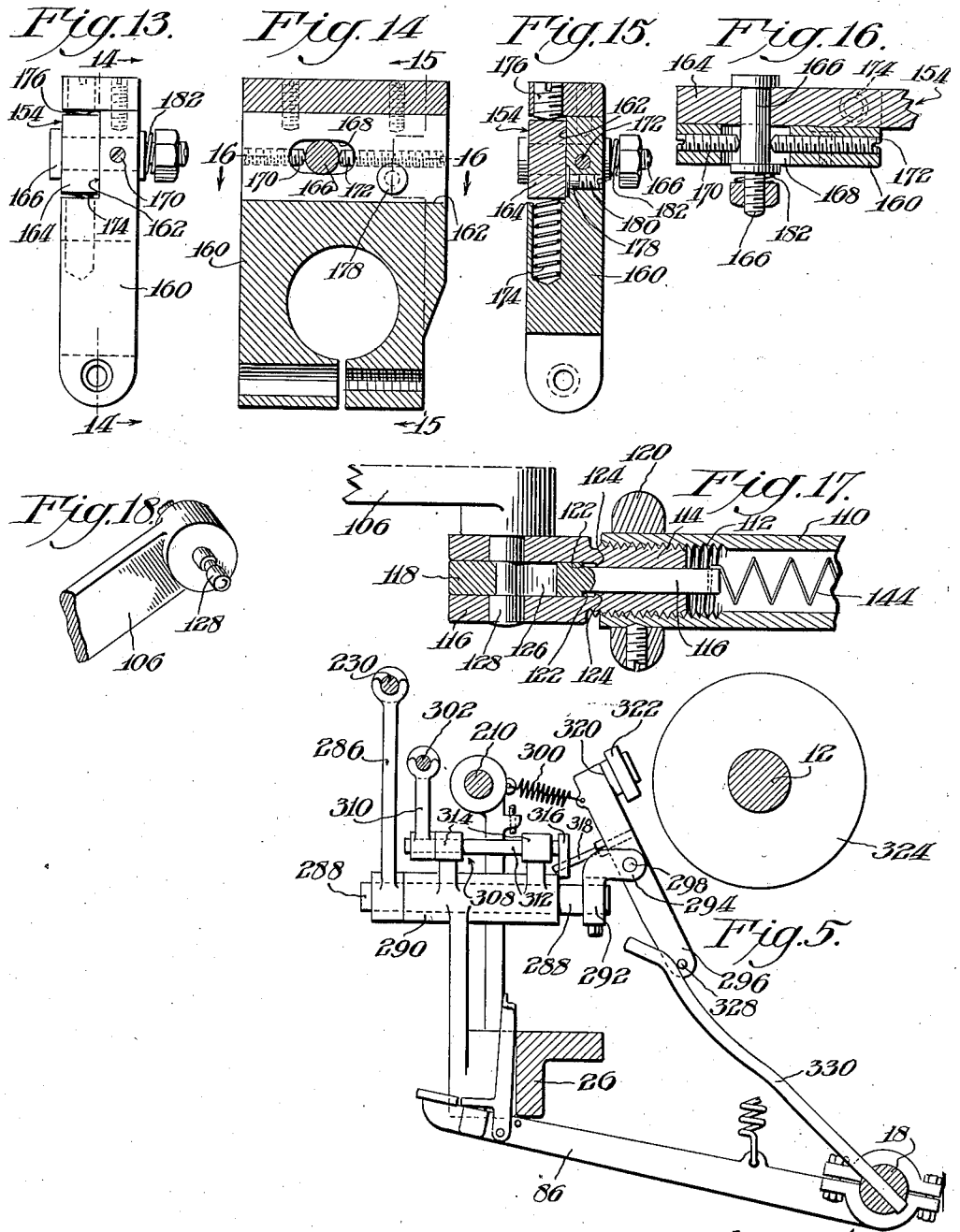

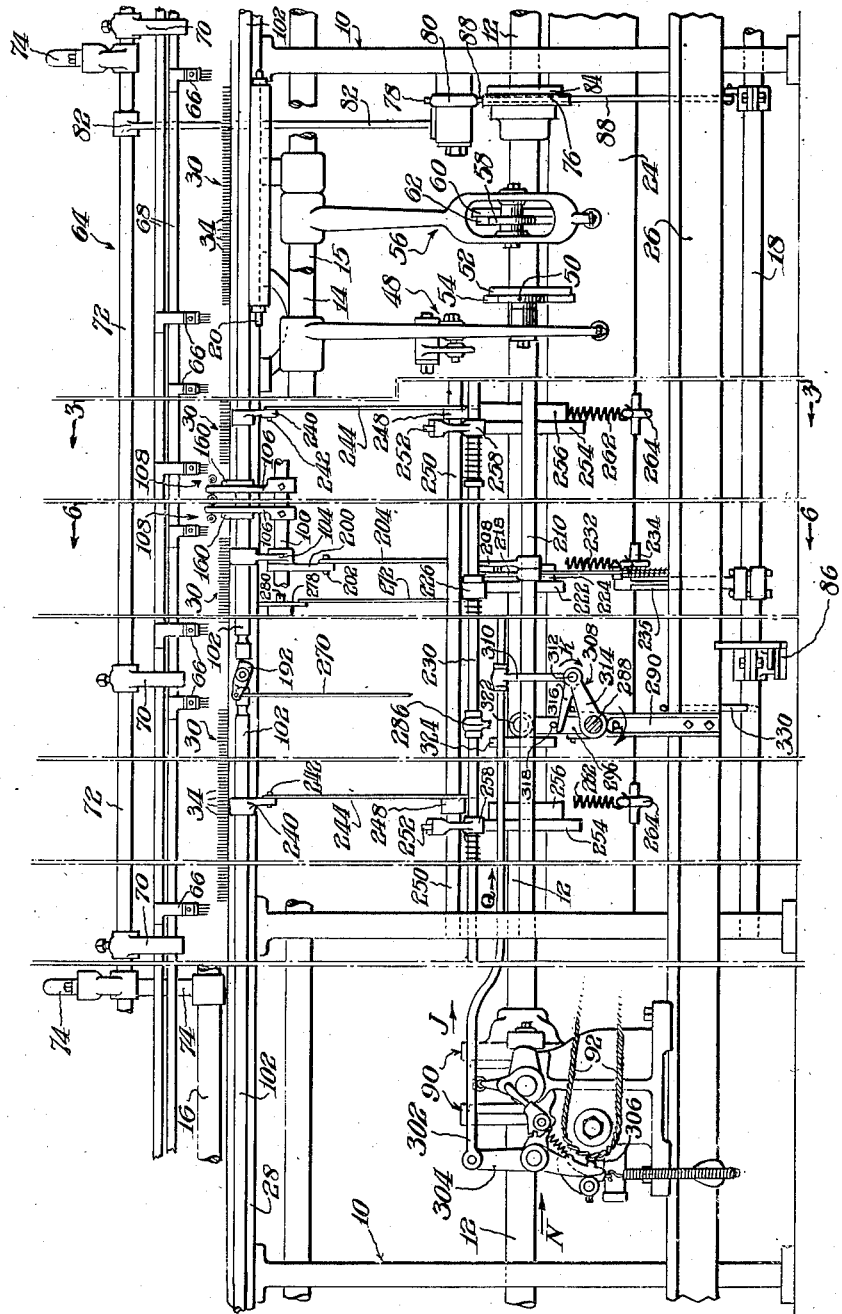

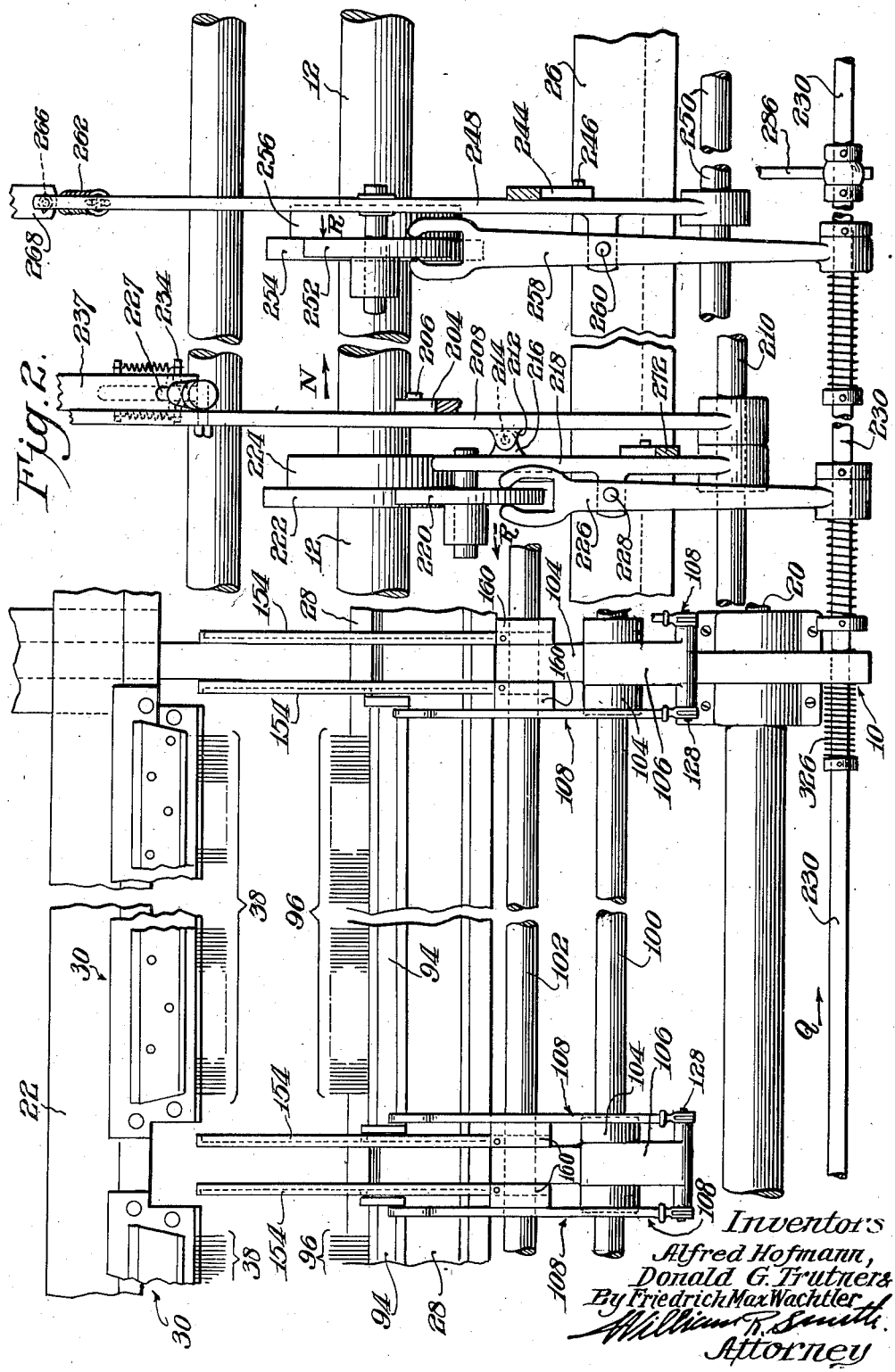

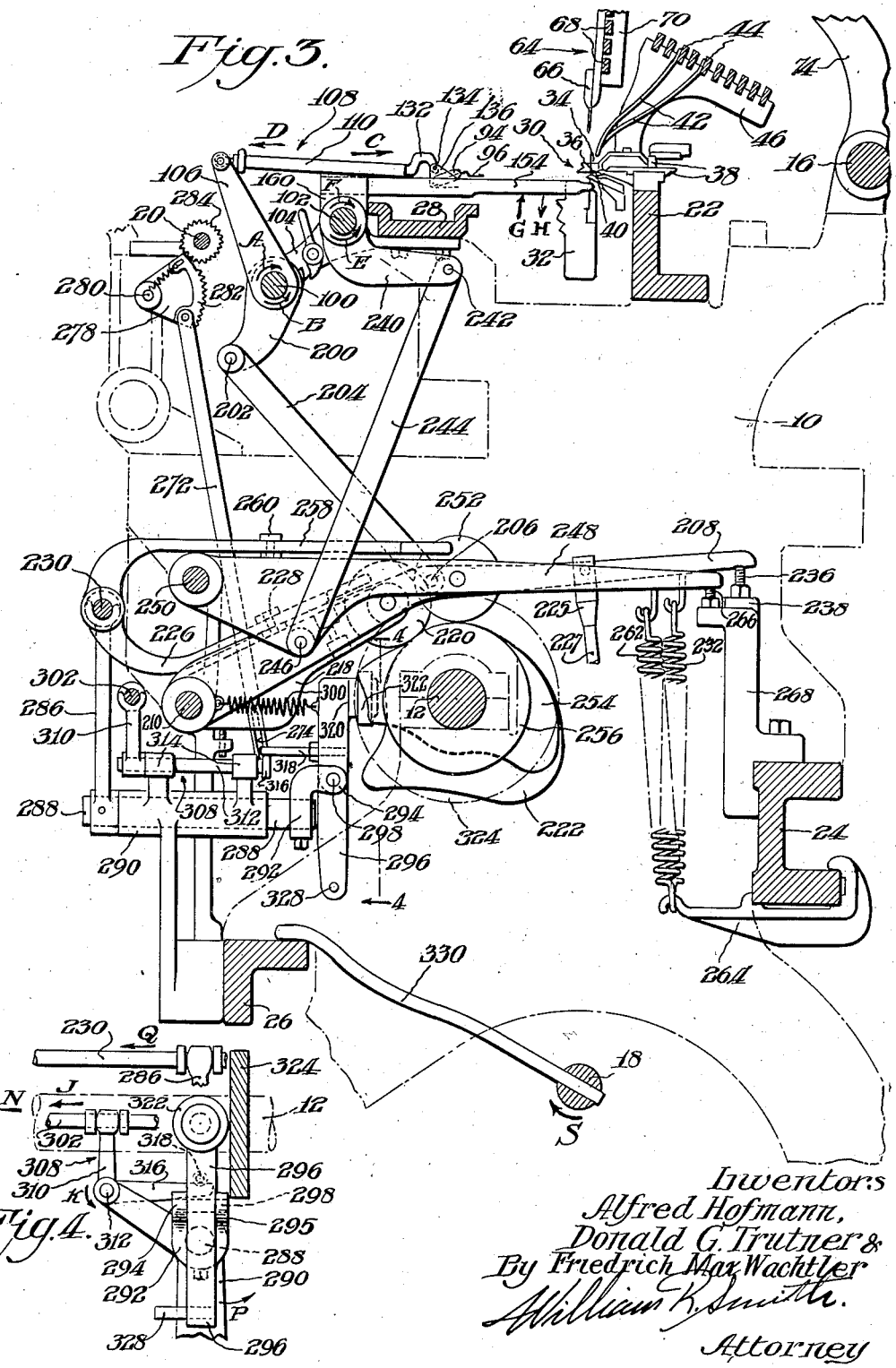

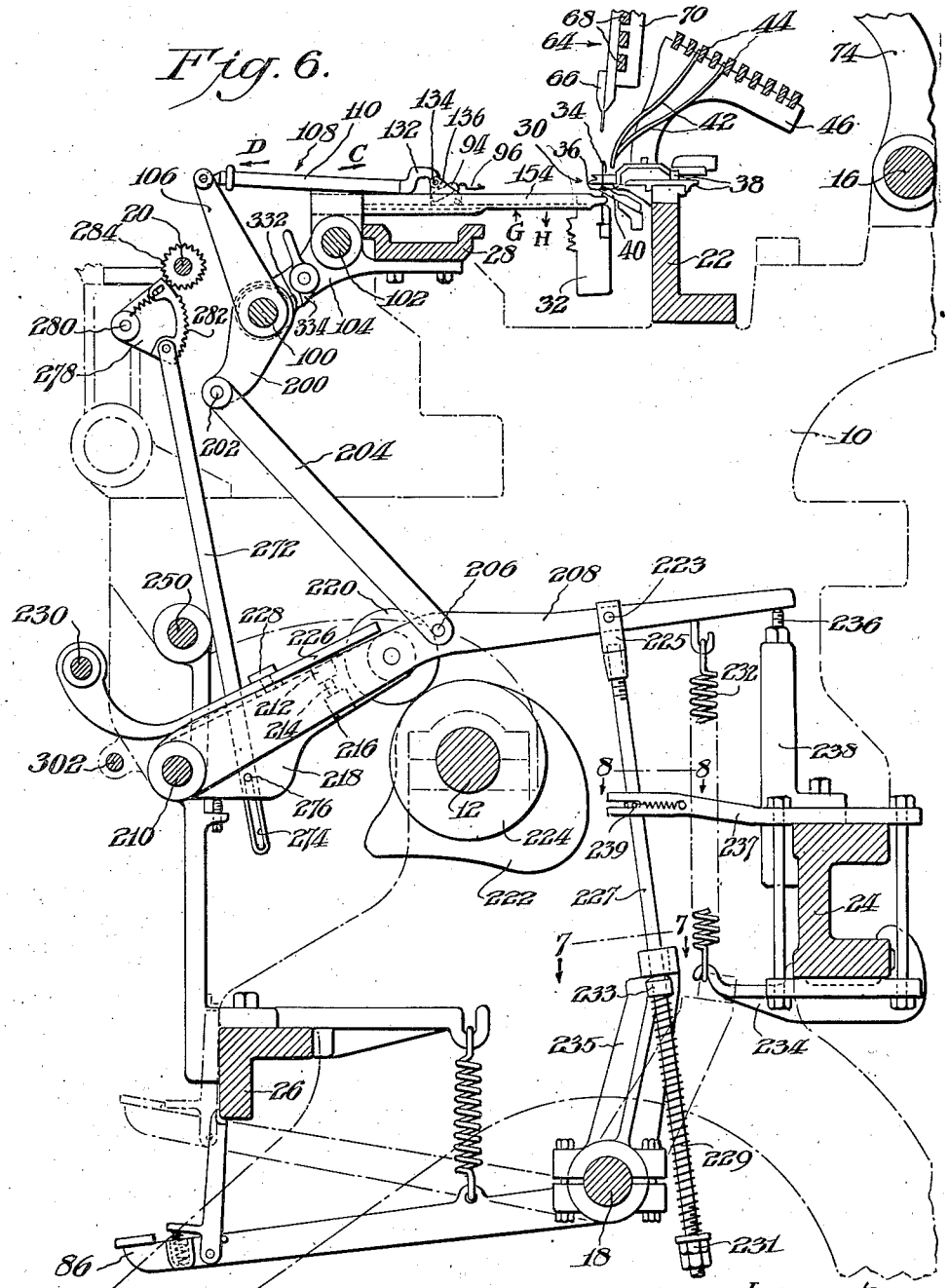

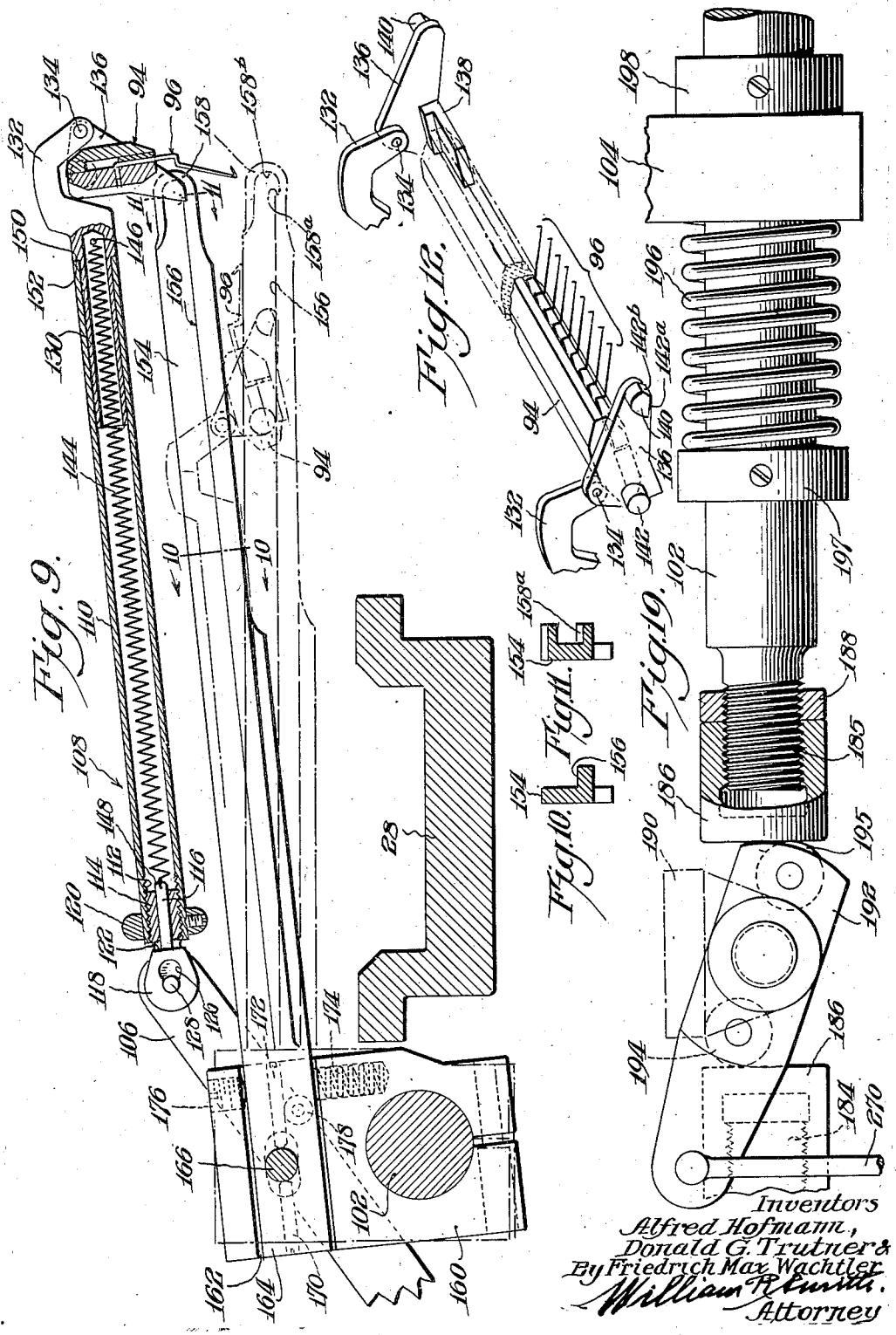

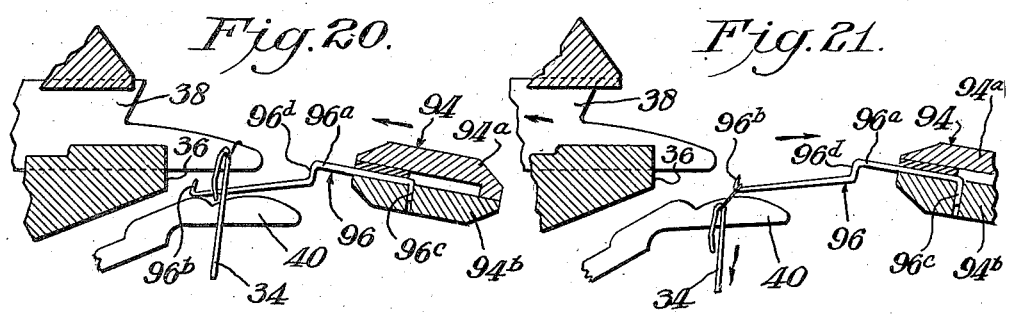
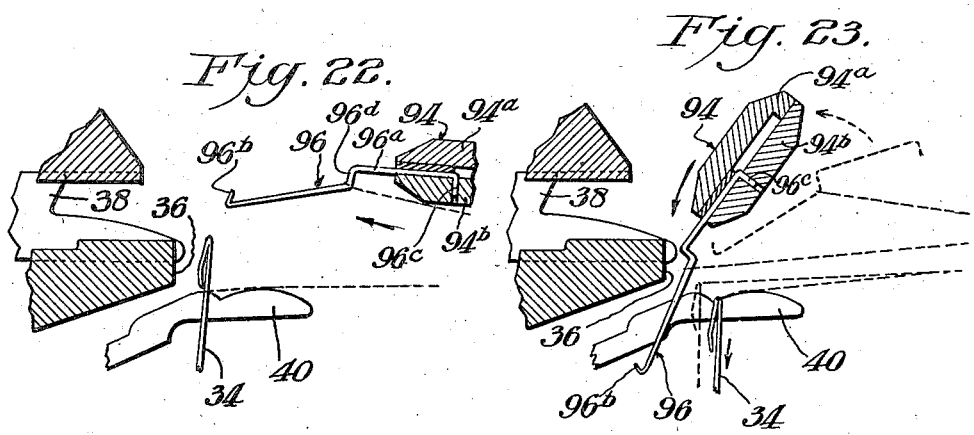
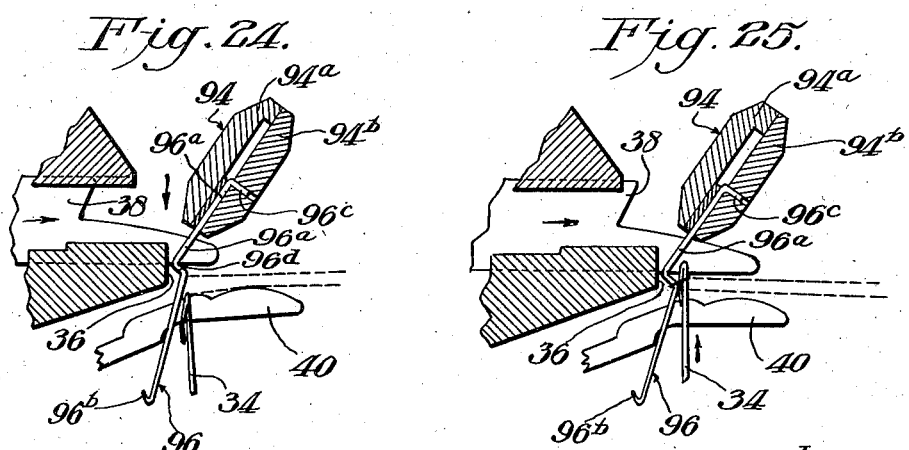

March 12, 1946.   A. HOFMANN ET AL   2,396,263
WELT TURNING ATTACHMENT
Filed Jan. 29, 1941   8 Sheets-Sheet 8
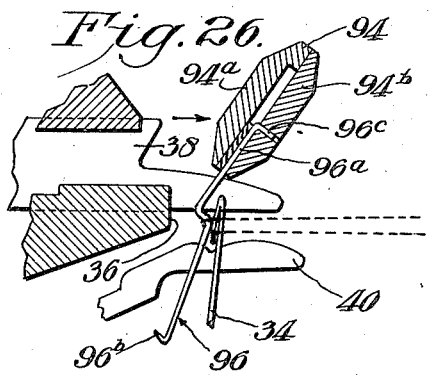
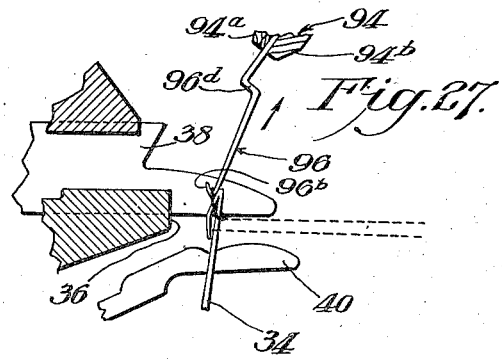
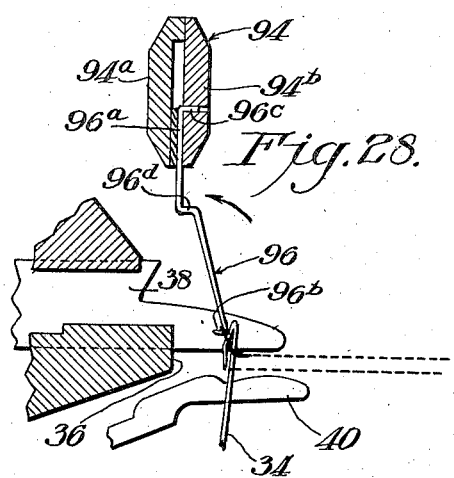
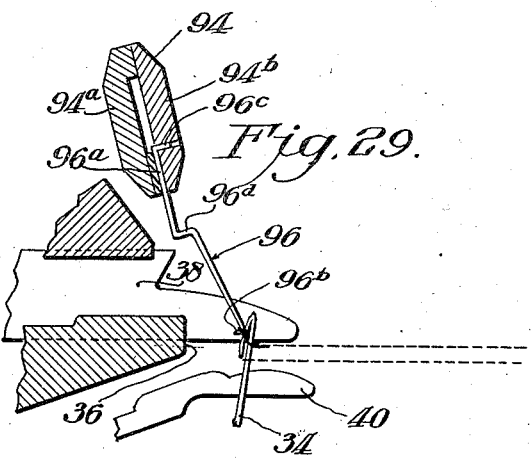
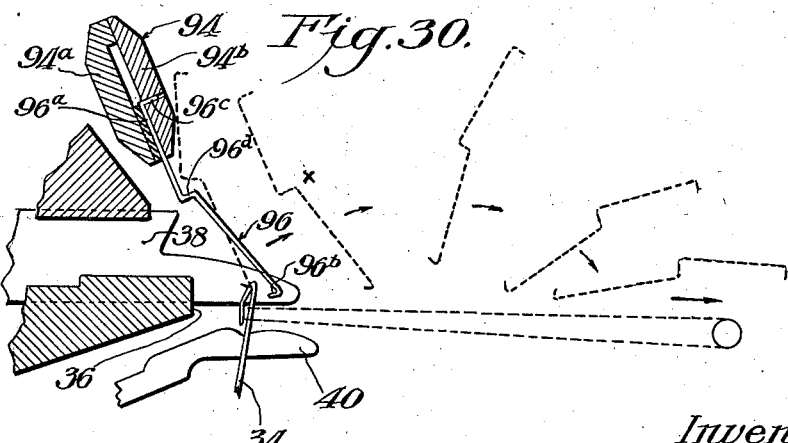
Inventors
Alfred Hofmann
Donald G. Trutner &
By Friedrich Max Wachtler
William R. Smith
Attorney Patented Mar. 12, 1946

2,396,263

UNITED STATES PATENT OFFICE 2,396,263

WELT TURNING ATTACHMENT

Alfred Hofmann, Palisade, Donald G. Trutner, North Arlington, and Friedrich Max Wachtler, West New York, N. J., assignors to Alfred Hofmann, Inc., West New York, N. J.

Application January 29, 1941, Serial No. 376,434

29 Claims. (Cl. 66—96)

The present invention relates to an attachment for flat knitting machines and, more particularly, to a welt bar operating attachment operable to controllably impart horizontal, vertical, tilting, and slanting movements to the welt bar for automatic or semi-automatic welt turning.

In the knitting of welt fabric on full-fashioned hosiery machines adapted for the use of certain types of recently developed automatic welt turning mechanisms, various devices have been constructed to provide the necessary movements for the welt bar. Such devices, however, have been found expensive to manufacture, insufficiently reliable in operation, or lacking various desirable functions and features for continued satisfactory performance in connection with automatic or semi-automatic turning of welts throughout the multiple knitting sections of the knitting machine.

It is, therefore, the general object of the present invention to provide an improved welt bar operating attachment of simplified construction involving reduced expense in manufacturing and adapted to receive accurate and reliable adjustments, and furnishing improved operating mechanisms to impart the desired welt bar movements.

Specific objects of this invention reside in the provision of a link mechanism for the welt bar carrying elements, which mechanism is adapted for resiliently tensioning the fabric during the draw-off in one direction, that is, in the direction away from the knitting elements; in the provision of a mechanism capable also of automatic or semi-automatic operation for positively moving the welt bar in the other direction, that is, in the direction towards the knitting elements for placing said welt bar into position preparatory to engaging the initial loops as well as for accurate positioning of the welt bar preparatory to the loop transfer back onto the needles during the formation of the welt; and the provision of a mechanism operable to bring the welt hooks into cooperative engagement with the needles and thereafter to retract said welt bar to its inoperative position away from the knitting elements.

It is a further object of the invention to provide an attachment to impart the necessary movements to the welt bar carrying elements and turning devices in a rectilinear horizontal plane, as well as in a rectilinear slanting plane, and to guide the welt bar in a curvilinear motion according to the respective method of automatic or semi-automatic welt turning.

Without limiting the possible application of this invention or modifications thereof to other methods of welt turning, the description herein is based on the motion and operation requirements of the welt bar according to the disclosure of the copending application, Serial Number 304,492, filed November 15, 1939, the present invention presenting modified and improved operating means and mechanisms.

With this purpose in mind, the present invention contemplates an improved construction of guide rails for the movements of the welt bar, in combination with link mechanisms, said guide rails being suited for mounting on an auxiliary shaft extending across the length of the machine along the front table thereof, and the construction of the rails and the mountings therefor being so arranged that by slight rotation of the shaft actuated by cam means, the rail ends extending towards the needles may be caused to be slanted up and down.

With these and other objects in view, as may hereinafter become apparent, the several features of the invention consist in the devices, combinations, and arrangements of parts hereinafter described and claimed which, together with the advantages to be obtained thereby, will be readily understood by those skilled in the art from the following description and accompanying drawings.

For the purpose of illustration, there has been shown only so much of an ordinary flat full-fashioned knitting machine as is necessary to understand the embodiment and operation of the present invention for the relative motions and timed relation of movements of the welt bar and the knitting elements.

In these drawings:

Figure 1 is a front elevation of portions of a flat knitting machine embodying the invention;

Figure 2 is a top plan on an enlarged scale of a portion of the mechanism illustrated in Figure 1 with parts broken out and taken away for the sake of clarity in the illustration;

Figure 3 is an enlarged section taken substantially on line 3—3 of Figure 1 with certain parts removed;

Figure 4 is a rear elevation of certain parts illustrated in Figure 3 looking in the general direction of line 4—4, with certain parts removed;

Figure 5 is a side elevation of parts illustrated in Figure 3, but illustrating said parts in another position;

Figure 6 is a section taken substantially on line 6—6 of Figure 1, with certain parts taken away for the sake of clarity in the showing;

Figure 7 is a cross sectional detail taken substantially on line 7—7 of Figure 6;

Figure 8 is a cross sectional detail taken substantially on line 8—8 of Figure 6;

Figure 9 is an enlarged detail of a part of one of the welt bar carrying assemblies;

Figure 10 is a section taken on line 10—10 of Figure 9;

Figure 11 is a section taken on line 11—11 of Figure 9;

Figure 12 is a perspective of the welt bar and portions of the supporting assemblies;

Figure 13 is an end elevation of a guiding rail and its supporting block;

Figure 14 is a section taken on line 14—14 of Figure 13;

Figure 15 is a section taken on line 15—15 of Figure 14;

Figure 16 is a section taken on line 16—16 of Figure 14;

Figure 17 is an enlarged cross sectional detail of a portion of parts shown in Figure 9;

Figure 18 is a perspective of one of the arms adapted to establish the connection between the welt bar carrying assemblies and the motion imparting means;

Figure 19 is an enlarged detail of a part of the side-stepping mechanism;

Figures 20 to 30 inclusive are somewhat diagrammatic illustrations of the sequence of movements of the welt bar in the automatic operation thereof.

Referring more particularly to the drawings wherein like characters of reference will designate corresponding parts throughout, the machine frame is designated at 10 and carries the usual bearings for supporting the various shafts of the knitting machine including the rotatable longitudinally shiftable main cam shaft 12, the oscillating presser shaft 14, the oscillating needle bar shaft 15, the oscillating back narrowing shaft 16, the oscillating narrowing mechanism lifting shaft 18, and the rotatable wareroller shaft 20. The machine frame is also provided with the usual center beam 22, back beam 24, front beam 26, and front table 28.

Arranged about the center beam 22 in the customary manner are the multiple knitting sections 30. Each knitting section 30 comprises a straight needle bar 32 with its bank of needles 34 disposed to cooperate with the presser edge 36, jack and dividing sinkers 38, and knockover bits 40 for the knitting of fabric in the manner known in the art. Yarn is fed to the knitting section 30 by means of yarn carriers 42 connected to carrier bars 44 supported in brackets 46 on the machine frame 10.

As is customary, the needle bar 32 is movable horizontally and vertically. Horizontal movement is imparted to the needle bar by means of a link and lever mechanism 48 including a roller 50 disposed for riding engagement with a presser knitting cam 52 or a presser narrowing cam 54 on the main cam shaft 12 depending upon the shifted position of said shaft. Vertical movement is imparted to the needle bar by means of a link and lever mechanism 56 including a roller 58 disposed for engagement with a knitting cam 60 or a narrowing cam 62 on the main cam shaft 12, depending upon the shifted position of said shaft.

Adapted for cooperation with the knitting sections of the machine is a narrowing mechanism 64 comprising sets of narrowing combs 66 fixed to the narrowing bars 68 slidably mounted in brackets 70 secured on a rod 72 suspended from arms 74 rigidly connected to the back narrowing shaft 16 on the machine frame. The narrowing mechanism is adapted to be lowered and raised bodily in order to pick up and transfer loops, the lowering and raising of the narrowing mechanism being accomplished by means of an active cam 76 on the main cam shaft 12 acting, when said shaft is shifted to its narrowing position, on a roller 78 carried by a lever 80 pivoted onto the machine frame and connected through a link 82 to the rod 72. When the main cam shaft 12 is shifted to its knitting position, a neutral cam 84 is brought into engagement with the roller 78 so that the narrowing mechanism becomes inoperative. Whenever the narrowing mechanism is not in operation, it may be locked in inoperative elevated position by depressing a pedal 86 which oscillates the lifting shaft 18, thereby swinging an arm 88 for engagement with the cam roller lever 80, thereby maintaining the entire narrowing mechanism in its elevated inoperative position.

The shifting of the main cam shaft 12 is governed in the usual manner by a shogging mechanism 90 which, in turn, is controlled in the usual manner through the operation of a pattern chain 92.

Each knitting section 30 of the machine is adapted to cooperate with a welt bar 94 for the purpose of forming welt fabrics on said machine. The welt bar has the usual well known construction including the clamping sections 94a and 94b cooperating to secure a bank of welt hooks 96. The welt hooks 96 preferably are of the type shown and described in detail in co-pending application, Serial Number 304,492, filed November 15, 1939, for the purpose stated therein, that is, the welt hooks 96, which also serve as welt transfer elements, are adapted for cooperative action with the knitting needles 34 and sinkers 38 to receive the loops of the initial course knitted by said needles and subsequently return said loops onto the needles in the formation of the welt.

Each welt hook 96 preferably has the construction shown, consisting of a shank 96a, a hook end 96b, and a butt end 96c, a portion of the shank and the butt end adapted to be clamped between the sections 94a and 94b of the welt bar 94. The portion of the shank 96a projecting outwardly of the clamping bar sections 94a and 94b is bent and kinked to form an intermediate angular portion 96d, that part of the shank from a point adjacent the hook end 96b to a point adjacent the angular portion 96d being grooved for cooperation with the needle beards, as will be specified hereinafter.

The essential purposes of providing the welt hook with the intermediate angular portion 96d are to form a stop for the retraction of the initial sinker loops of the welt fabric in order to enable said initial sinker loops to line up for even and accurate transfer to the needles after the knitting of the desired length of welt fabric and in order to provide for a free passage of the needle beards through the groove of the shank for facilitating the picking up of the initial sinker loops by the needles; and to form a downward angular displacement of the grooved part of the shank as against the remaining part of the shank so that the hook is vertically downwardly displaced from the horizontal upper shank in order to enable gradual retraction of the initial sinker loops towards the loop stop in an upward slanting plane, during the returning motion of the welt bar for transferring said initial sinker loops onto the needles, or while the welt fabric is drawn off by the welt roll under the welt bar, and also to place the welt hooks into position for the return of said sinker loops to the needles by a displaced turning motion of the welt bar, whereby to limit its travel towards the sinker head, and finally, to prevent excessive stretching or dragging of initial sinker loops while retracting on the grooved portion of the shank.

In order that the welt hooks 96 may receive sinker loops of the initial course knitted by the needles 34, and subsequently return said loops to the needles, the welt bar 94, according to the present invention, is capable of going through a sequence of movements. In describing the movements of the welt bar, the terms "forward" and "backward" are used with respect to the welt bar itself, the welt hooks being regarded as located at the welt bar front which normally is disposed to face the needles from the front of the machine frame. Therefore, the term "forward" indicates the movement of the welt bar in a general direction from the front to the back of the machine, whereas the term "backward" indicates the movement of the welt bar in a general direction from the back towards the front of the machine frame. When referring to the placement of the welt hooks behind the needles, the term "behind" is used with respect to the forward movement of the welt bar, which forward movement is employed for the presentation of the welt hooks to the needles. Therefore, the term "behind" indicates the location of the welt hooks on the bearded side of the needles between the latter and the presser edge.

The sequence of the welt bar movements is illustrated in Figures 20 to 30 inclusive. As shown in Figure 20, the welt bar first undergoes a rectilinear horizontal forward movement to advance the welt hooks towards the needles for bringing said hooks from an inactive to an active position, the welt bar being located for so positioning the welt hooks in relation to the needles that during the continued rectilinear forward movement of the welt bar, the hook ends of said welt hooks will pass between the needles in line with the sinkers at a point between the sinkers and the knockover bits to engage the initial sinker loops when they are cast off the sinker nibs.

As shown in Figure 21, the welt bar then undergoes a rectilinear horizontal backward movement to retract the welt hooks away from the needles after engaging the sinker loops and, accordingly, draw the welt fabric under tension while being knitted.

As shown in Figure 22, the welt bar then undergoes a rectilinear slanting upward movement towards the needles to turn the welt fabric and bring the hook ends of the welt hooks on a plane above the heads of the needles, the welt bar being located for so positioning the welt hooks in relation to the needles that during this movement of the welt bar, the hook ends of the welt hooks are in alignment with the needles.

As shown in Figure 23, the welt bar then undergoes a curvilinear substantially forward movement towards the needles to cause the vaulting of the welt hooks over the needles and continuing in a curvilinear substantially downward movement to place said welt hooks behind the needles, that is, on the bearded side thereof, where said hooks are held stationary until the needles go into position preparatory to the transfer of the initial sinker loops back onto the needles.

As shown in Figure 24, the welt bar then undergoes a rectilinear substantially downward movement to bring the initial sinker loops adjacent to the needle heads at a point between the knockover bits and the sinkers to place said loops in position for engagement by the needles, after which the needles rise and enter said initial loops (Figure 25).

As shown in Figure 26, the welt bar then undergoes a substantially rectilinear backward movement whereby the welt hooks follow the movement of the needles for placing the same in position preparatory to the unhooking movements.

As shown in Figure 27, the welt bar then undergoes a substantially rectilinear vertical upward movement cooperating with the needle motion, eventually bringing the loops under tension between the sinkers and the hook ends of the welt hooks.

As shown in Figure 28, the welt bar then undergoes a thrust forward movement bringing the hook ends of the welt hooks into a substantially horizontal position preparatory to unhooking.

As shown in Figure 29, the welt bar then undergoes a slightly vertical downward movement causing the bent points at the hook ends of the welt hooks to slip past the beards of the needles, thus relieving the tension of the initial sinker loops for the instantaneous disengagement of the hooks from said loops.

The movements separately illustrated in Figures 28 and 29 are more or less simultaneous so that the positioning of the hook ends into a substantially horizontal plane, the relieving of the tension on the transferred loops, and the unhooking of the welt hooks from said loops follow in rapid succession in the manner represented in Figure 30.

As represented in Figure 30, the welt bar then undergoes a combined lifting and swinging movement to move the welt hooks out of the knitting field, the welt bar thence being guided in a curvilinear tilting backward movement away from the needles to place the welt hooks in their lowered normal draw-off position in a substantially horizontal plane and, finally, in a rectilinear horizontal backward movement away from the needles to return the welt hooks to their original inactive position.

From the foregoing, it will be understood that, in accordance with the improved method, the movements of the welt bar may be divided into three distinct groups, as follows:

1. Movements to effect the bringing of the welt bar from an inactive to an active position for the hooking up of the welt hooks with the initial sinker loops, and for the drawing of the welt fabric under tension while being knitted (Figures 20 and 21).

2. Movements to effect the turning of the welt fabric and the transferring of the initial sinker loops back onto the needles (Figures 22, 23, 24, 25, and 26).

3. Movements to effect the unhooking or releasing of the welt hooks from the initial sinker loops after their transfer onto the needles and the returning of the welt bar to inactive position (Figures 27, 28, 29, and 30).

Attention is particularly called to the fact that the movement of the welt bar for the positioning of the hook ends on a substantially horizontal plane is possible because of the particular formation of the welt hooks, that is to say, the angular relationship of the bent portions of the shanks are such that the sinker head and other parts of the machine will not prevent or interfere with the movement of the welt bar to its tilting limit for positioning the hook ends on a substantially horizontal plane, as aforesaid.

Also, it is to be noted that the pivot point about which the welt bar swings in its movements to relieve the tension on the loops transferred onto the needles and unhook the welt hooks from said loops is located, as shown at X in Figure 30, in front of the left bar proper and below the center thereof, thus enabling the welt bar to vault over the needles gradually in a curvilinear motion with a minimum lift of the welt bar and, at the same time, reducing the forward travel of the welt hooks to a minimum to prevent possible interference with existing parts on the knitting machine.

The welt bar 94 in each knitting section 30 is intended, in order to form the welt, to be controlled for displacement through the sequence of movements aforesaid, the present invention, as hereinbefore stated, being particularly directed to an improved and simplified attachment to impart such movements to the welt bar and control the welt bar through such movements. The attachment comprehends welt bar carrying and movement guiding assemblies, and several mechanisms cooperatively associated with said assemblies for synchronized automatic function in the manner fully set forth hereinafter.

For convenience, these mechanisms are identified as follows:

I. Welt bar advancing and retracting mechanism
II. Welt bar lifting and lowering mechanism
III. Welt bar side-stepping mechanism
IV. Tension release mechanism
V. Control mechanism
VI. Safety mechanism

WELT BAR CARRYING AND MOVEMENT GUIDING ASSEMBLIES

In addition to the usual machine shafts, there is provided, according to this invention, an auxiliary shaft 100 and an auxiliary shaft 102. Said auxiliary shafts 100 and 102 extend longitudinally of the machine and are rotatably mounted for rocking motion in bearings, such as bearing 104 spaced along and fixed to the front table 28.

Rigidly fixed to the auxiliary shaft 100 are arms 106 preferably spaced so that one arm is located between each pair of knitting sections and at the outside end of each of the end knitting sections. Adapted for pivotal connection to the arms 106 are link devices 108.

Each of the link devices 108 preferably comprises an elongated tubular section 110 having one end screw-threaded, as shown at 112, for adjustably receiving a forked shaped member 114 constructed for slidable engagement with a somewhat reduced portion or stem 116 of a connection element 118, thus guiding said element into the tubular section 110. The forked shaped member 114 may be locked in adjustable position relatively to the tubular section 110 by means of a locking collar 120. It will be appreciated that the reduced portion 116 provides the connection element 118 with shoulders 122 which may contact the adjacent surface 124 of the forked shaped member 114 and, therefore, limit the introduction of said element into the tubular section.

The connection element 118 is preferably formed with a key-hole shaped slot 126 adapted for engagement with a stud headed pin 128 carried by the associated arm 106 whereby a detachable pivotal connection may be had between said arm 106 and associated link device 108. Freely received within the other end of the tubular section 110 and arranged in telescoping relationship therewith is a connection piece or connector 130 terminating with an enlarged arcuate finger 132 pivoted, for instance, by means of a riveted pin 134 to a welt bar carrying element 136. The welt bar carrying elements 136, as shown in the drawings, preferably consist of plates, each having on one of its faces a lateral extension 138 with which the corresponding end of the welt bar is rigidly attached. Each plate, moreover, has on the other face thereof a skid block 140 and a roller or pin 142. This skid block is preferably formed with flattened angular surfaces 142a and 142b and a rounded surface 142c for the purpose to be hereinafter specified.

The connection piece 130 is normally urged inwardly of the tubular section 110 by means of a coil spring 144 having one of its ends connected to said connection piece 130, as shown at 146, and the other of its ends connected to the portion 116 of the connection element 118, as shown at 148. The inward movement of said connection piece 130, however, is limited by means of shoulders 150 formed thereon and adapted to abut the adjacent edge 152 of the tubular section 110.

The provision of the spring 144, it will be appreciated, moreover furnishes a yieldable connection between the connection element 118 and the connection piece 130 which affords to the device a resilient and flexible union advantageous in effecting the formation of the welt, as will be described more fully hereinafter.

It will be noted that the spring 144 also acts to exert a constant pull on the connection element 118, thus normally urging the key-hole shaped slot 126 into positive engagement with its stud headed pin 128, accordingly establishing the proper secured connection between the device and its associate operating arm 106, but that said connection element 118 may be moved in a direction opposite to that of the pull exerted thereon by the spring 144 to bring the key-hole shaped slot 126 in position for disengagement from said pin 128 on the associated arm 106. In this manner, it will be understood that each welt bar carrying assembly consisting of the link devices 108, carrying elements 136, and welt bar 94 of any individual knitting section 30 may be removed easily and readily as a unit from its position on the knitting machine frame without affecting the attachment as to the other knitting sections, whenever such removal is necessary for any purpose such as the adjustment, repair, or replacement of parts.

From the foregoing description of the welt bar carrying assemblies, it will be understood that by turning the shaft 100 in the direction of arrow A or B, the link devices 108 and welt bars 94 throughout the entire length of the knitting machine will be moved in unison towards or away from the needles 34, that is, in the general direction of arrow C or D.

The link devices 108 and the welt bars 94 are guided in their movements towards and away from the needles 34 by means of rails 154 having tracks 156 on which ride the rollers or pins 142 and skid blocks 140 of the welt bar carrying elements 136. The track 156 of each of the rails 154 terminates with a blind end portion 156 provided with a shoulder 158a and a semi-circular surface 158b for the purpose to be specified hereinafter.

It will be appreciated that in order to effect the turning of the welts, it is also necessary that the welt bars, during their movements towards the needles 34, be lifted and tilted to the position more clearly shown in full lines in Figure 9 which brings the welt hooks 96 in position for longitudinal engagement with the needles 34 for the transfer of the initial course of loops from said welt hooks onto said needles. For that purpose, each of the rails 154 is carried by a block 160 rigidly secured to the auxiliary shaft 102 so that when said shaft is rocked, as indicated by the arrows E and F, the rails are swung, as indicated by the arrows G and H.

When the rails 154 are swung in the direction of arrow G to the position shown in full lines in Figure 9, and the link devices 108 and welt bars 94 are moved in the direction of arrow C, that is, towards the needles 34, it will be understood that said rails guide said link devices and welt bars in a rectilinear upwardly slanting plane until the skid blocks 140 of the welt bar carrying elements 136 reach the blind end portions 158 of the rail tracks 156 said portions 158 then acting as stops preventing further rectilinear forward motion of the welt bars 94. At that point, the continued advance of the link devices 108, because of the force applied at the pivotal connections 134 located above the rail tracks 156, causes the welt bar carrying elements 136 to pivot, accordingly tilting the welt bars 94 in a curvilinear motion over and behind the needles 34 for the engagement of the welt hooks 96 with the bearded side of said needles 34.

Since the proper engagement of the welt hooks 96 with the needles 34 depends upon the accurate positioning of the blind end portions 158 of the tracks 156 in relation to the needles, the invention contemplates the provision of a highly micrometric adjustable connection between the rails 154 and the supporting blocks 160.

As illustrated in the drawings, such a connection may be had by providing each of the blocks 160 with a transversal recessed portion 162 into which the end portion 164 of the associated rail 154 is fitted loosely for endwise, edgewise, and sidewise adjustments. The end portion 164 of the rail 154 received in the transversal recessed portion 162 of the corresponding supporting block 160 is connected to said block by means of a bolt 166 disposed to project through an elongated aperture 168 formed in the wall of said recessed portion to extend longitudinally thereof.

Arranged in said wall to penetrate into the elongated aperture 168 from the diametrically opposed ends thereof are screw-threaded elements 170 and 172 adapted to bear on opposite sides of said bolt 166 whereby, upon relatively screwing or unscrewing the elements 170 and 172, the rail is slid endwise so that the blind end portion 158 of said track 156 is adjusted to a point nearer to, or further away from the needles 34.

Arranged on each of the blocks 160 to bear upon one edge of the rail end portion 164 is an adjusting element 174 which may be in the form of a spring while also arranged on said block to bear against the opposed edge of said rail is a screw-threaded member 176 whereby, upon screwing or unscrewing said member, the rail 154 is rocked edgewise so that the blind end portion 158 of the rail track 156 is adjusted to a higher or lower point in relation to the needles 34.

Likewise arranged in said block to bear upon one side of the rail end portion 164 is a plug 178 associated with a screw-threaded pin 180 whereby, upon screwing or unscrewing said pin, the plug 178 displaces the rail sidewise so that the blind end portion 158 of the rail track 156 is adjusted to a point to the right or to the left in relation to the needles 34. To permit this sidewise adjustment, the bolt 166 connecting the rail end portion 164 to the block 160 may be associated with a spring washer 182.

Due to this particular mode of connection between the rails 154 and their supporting blocks 160, it will be appreciated that there is provided universal adjusting means whereby the proper and accurate positioning of the welt hooks 96 relative to the needles 34 is assured.

Attention is called to the fact that because of the construction and association of elements, there is provided such a flexibility of adjustments that not only can the particular welt turning elements in each knitting section be adjusted relatively to each other to assure the proper function of the welt bar in the associated knitting section, but said elements in one knitting section may be adjusted relatively to such elements in the other knitting section to assure the proper function of the welt bars in their respective knitting sections. Consequently, a characteristic advantage of the invention is found in the fact that, although the welt turning elements comprised within each of the multiple knitting sections of the machine are moved simultaneously and in unison throughout the length of the machine by the function of operable means, such as shafts 100 and 102, common to said elements, yet such elements may be adjusted individually to suit the particular knitting section within which they are intended to function for properly actuating the welt bar and accurately positioning the welt hooks.

Moreover, in order to assure the accurate positioning of the welt hooks 96 in relation to the needles 34, to effect the formation of the welt, the welt bar 94 must be shifted so as to bring said welt hooks in alignment with the needles since said hooks must be positioned to pass between the needles for the hooking of loops in the initial courses.

For that purpose, and in accordance with the preferred construction shown in the drawings, the shaft 102 is split into two sections, one section extending throughout one half of the length of the machine, and the other section extending throughout the remaining half of the length of the machine. The aligned end portions 184 and 185 of said sections are relatively spaced and provided with adjustable bushings 186 which may be locked in adjusted position by means of locking rings 188.

Suitably secured to the front table 28 of the machine frame 10, and disposed to extend between the spaced end portions 184 and 185 of the sectional shaft 102 is a bracket 190 carrying an oscillating lever 192 having a pair of diametrically opposed rollers 194 and 195 respectfully bearing upon the adjoining faces of the bushings 186. The end portions 184 and 185 of the shaft sections may normally be urged towards each other for constant engagement with the rollers 194 and 195 by means of springs 196 acting on a collar 197 suitably arranged on said sections which may be provided with stop collars 198 adapted to move toward each other by abutting the adjacent shaft bearings 104 of the shaft sections.

Because of this construction, it will be understood that by oscillating the lever 192 in the direction of arrow I, the rollers 194 and 195 are caused to bear against the bushings 186 carried by the spaced aligned end portions 184 and 185 of the sections of the shaft 102, thus forcing said sections against the action of the spring 196 and, accordingly, spreading the sections away from each other. This spreading displaces the welt bar track rails 154 sidewise carrying the welt bar 94 therewith so that the welt hooks 96 become adjusted with respect to their associated needles 34 since said tracks are connected to the shaft sections by means of the blocks 160.

According to the present invention, the welt bar carrying and movement guiding assemblies are controlled automatically during the function of the knitting machine by means of the several mechanisms hereinafter described, which are cooperatively associated with said assemblies and intimately corelated to the knitting machine. These mechanisms will now be described.

I.—Welt bar advancing and retracting mechanism

For the purpose of automatically rotating the shaft 100 to impart motion to the link devices 108 and welt bars 94, there is affixed to the shaft 100 a lever 200 having pivoted thereto, as shown at 202, a link 204 which, in turn, is pivoted, as at 206, to an arm 208 mounted for vertical oscillating movement on a shaft 210 supported on the machine frame 10.

The arm 208 is formed with a laterally extending abutment 212 disposed for engagement with an adjustable pin 214 screw-threaded in a projection 216 rigid with an arm 218 also mounted for vertical oscillating movement on the shaft 210. The arm 218 carries a roller 220 disposed to contact either an active cam 222 or a neutral cam 224 on the main cam shaft 12, depending upon the relative shifted positions of said roller and said main cam shaft, as will be hereinafter pointed out. In order to shift the roller 220, there is provided a forked lever 226 pivotally attached, as at 228, to the arm 218 and connected to a shifting rod 230.

Constant riding engagement of the roller 220 with the active cam 222 or the neutral cam 224 may be assured by means of a spring 232, or like force applying means, connected to the arm 208 and to a bracket 234 suitably mounted on the back beam 24, the action of the spring 232 being, however, limited by means of an adjustable stop 236 carried by a suitable support 238 on the back beam 24 and disposed to abut a portion of the under side of the arm 208. Thus it will be understood that as long as the roller 220 contacts the neutral cam 224, the link devices 108 and, accordingly, the welt bars 94, are maintained in retracted position, that is, in the position more clearly shown in Figures 3 and 5, but that when the roller contacts the active cam 222, a swinging motion is imparted to the arms 218 and 208 which motion oscillates the shaft 100 through the connecting link 204 and lever 200. The oscillation of the shaft 100, of course, rocks the arms 106 in the direction of arrows A and B, consequently advancing and retracting the link devices 108 together with the welt bars 94 towards and away from the needles 34, that is, in the direction of arrows C and D.

When the link devices 108 and welt bars 94 are advanced towards the needles 34 in the manner to be described fully hereinafter, to effect the turning of the welt fabric, it may be found desirable to subject the corelated parts to an increased load in order to minimize the amount of free play between said parts and thus assure the proper and accurate relationship thereof. This feature may be accomplished by providing the additional spring means shown in Figure 6. Such means may be had by pivoting as at 223 to the arm 208 a suitable connection element 225 from which depends an adjustable rod 227. The free end of the rod 227 is provided with a coil spring 229 freely retained thereon by means of locking nuts 231, or like holding elements. Associated with the spring 229 is a slidable cap 233 disposed to be engaged by a fork-like member 235 secured to the narrowing machine lifting shaft 18 when said shaft is rotated by the depressible pedal 86 to lock the narrowing machine in its elevated inoperative position, which is done according to the present invention at a time prior to the operation of the welt turner so as to prevent any possibility of the narrowing mechanism interfering with the function of the welt turner.

From the foregoing description of the additional spring means, it will be understood that when the fork-like member 235 engages the cap 233, the arm 208, upon being lifted by action of the active cam 222, will compress the spring 229, subjecting said arm 208 and associated parts to an increased load.

In order to guide the rod 227 and assure its position for engagement by the member 235, there may be provided a bar 237 straddling the rod 227 and having a spring actuated finger 239 yieldably retaining said rod in a certain relationship with respect to said member.

II.—Welt bar lifting and lowering mechanism

For the purpose of rocking the sectional shaft 102 to impart motion to the track rails 154, and in order that said shaft 102 may be rocked in timed relation with the actuation of the welt bar advancing and retracting mechanism, there is provided for each section of said shaft a lever 240 affixed thereto and having a pivotal connection, as shown at 242, with a link 244 which, in turn, is pivoted as at 246 to an arm 248 mounted for vertical swingable movement on a shaft 250 supported on the machine frame 10. The arm 248 carries a shiftable roller 252 disposed to contact an active cam 254 or a neutral cam 256 on the main cam shaft 12, depending upon the relative shifted positions of said roller and said main cam shaft.

The roller 252 may be shifted by means of a forked lever 258 pivoted as at 260 to said arm 248 and connected to the shifting rod 230 which, as previously stated, is likewise in engagement with the shifting forked lever 226 controlling the roller 220 of the welt bar advancing and retracting mechanism. Proper riding engagement of the roller 252 is assured by means of a spring 262 having one end suitably connected to the roller carrying arm 248 and the other end conveniently attached to a bracket 264 on the back beam 24 the action of the spring 262, however, being limited by means of an adjustable stop 266 carried by a suitable arresting member 268 conveniently fixed to the back beam 24 and disposed to engage a portion of the underside of the arm 248.

From the foregoing description, it will be understood that whenever the roller 252 contacts the neutral cam 256, the rails 154 are maintained in their lowered position more clearly shown in Figure 2, whereas whenever said roller 252 contacts the active cam 254, a swinging motion is imparted to the arm 248, which motion is translated through the link 244 and lever 240 into a rocking motion of the shaft 102, accordingly lifting and lowering the rails 154.

III.—Welt bar side-stepping mechanism

For the purpose of automatically spreading the sections of the shaft 102 relatively to each other for the displacement of the track rails 154 in order to adjust the welt hooks 96 with respect to the needles 34, there is attached to the lever 192 one end of a rod 270. The other end of this rod 270 may be conveniently associated with any part of the knitting machine capable of transmitting motion to said rod for actuating the lever 192 and thus side-step the welt bars to locate the welt hooks relatively to the needles for effecting the hook-up and turning of the welt. For instance, said other end of the rod 270 may be associated with the pattern chain 92, or it may be associated with the ordinary well known loose course mechanism (not shown) so that the welt bars may be side-stepped for their hook-up operation in timed relation to the customary operation of such loose course mechanism for the formation of the initial course of the welt fabric.

IV.—Tension release mechanism

It will be appreciated that in order to turn the welt, it is necessary that the tension applied to the welt fabric while being drawn off must be released and, therefore, the invention embraces the provision of a mechanism particularly devised to act on the wareroller shaft 20 for turning the same in a direction opposite to that of its drawing off rotation.

The preferred embodiment of this tension release mechanism includes a link 272 having at one of its end portions a longitudinal slot 274 adapted for engagement with a pin 276 carried by the roller carrying arm 218 of the welt bar advancing and retracting mechanism. The other end portion of the link 272 is pivotally connected to a segment 278 mounted for oscillation on a pivot 280 suitably supported on the machine frame. The segment 280 is provided with a spring pressed toothed rack 282 disposed for cooperative engagement with a pinion 284 affixed on the wareroller shaft 20.

From the foregoing description of the tension release mechanism, it will be understood that the movement of the lever 218 in the direction of arrow R is imparted to the link 272 by means of the pin 276 which abuts the upper end of the slot 274. This movement imparted to the link 272 oscillates the segment 278 in the direction of arrow S and, therefore, causes the toothed rack 282 to engage the wareroller shaft pinion 284 for rotating the wareroller shaft 20 in the direction of arrow T. This rotation unwinds the draw-off straps on the warerollers to release the fabric to the desired extent, said releasing of the fabric being controlled through the adjustable flexibility of the parts to maintain the necessary fabric tension as long as required, and to efficiently release temporarily and then restore the fabric tension during the various welt bar movements for turning the welt and transferring the initial loops back onto the needles.

V.—Control mechanism

In order to control the operation of the actuating mechanisms of the welt bar assemblies and their guiding rails, there is attached to the shifting rod 230 one end of a lever 286, the other end of which is extended for connection to a stub shaft 288 rotatably supported in a bearing 290 carried by the front beam 26 of the knitting machine frame 10.

Also affixed to the stub shaft 288 is a collar 292 provided with spaced ears 294 and 295 extending in a plane transverse to the axis of said stub shaft. Disposed between the ears 294 and 295 is an arm 296 which is pivoted to said ears by means of a pin 298 for swinging movement in a plane longitudinal to the axis of the stub shaft 288, that is, for movement in either one of two positions respectively illustrated in Figures 3 and 5. The arm 296 is normally urged for movement to the position shown in Figure 5 by means of a spring 300 connected to said arm and to a suitable portion of the machine. Movement of the arm 296 to the position shown in Figure 3 is imparted through a shifting rod 302 pivoted to a lever 304 acted upon by a button 306 on the pattern chain 92. Associated with the shifting rod 302 is a link arrangement 308 preferably consisting of an arm 310 having one of its ends connected to said shifting rod 302 and having the other of its ends secured to one end of a rotatable rod 312 mounted for oscillation on brackets 314 on the bearing 290. The other end of said rod 302 carries a lever 316 bearing against an abutment 318 rigid with the arm 296. In this manner, it will be understood that when the shifting rod 302 is actuated through the pattern chain 92 to shift in the direction of arrow J, the rotatable rod 312 is oscillated in the direction of arrow K, thus moving the lever 316 bearing against the abutment 318 and, accordingly, forcing the arm 296 to move for placement in operative position, that is, in the position shown in Figure 3.

One end portion 320 of the arm 296 is extended for substantial alignment with the cam shaft 12 and is provided with a roller 322 adapted, upon movement of said arm to operative position, to be engaged by the lateral face of a cam, such as cam 324, on the main cam shaft 12 so that when said cam shaft shifts in the direction of arrow N, the cam 324 engaging the roller 222 forces the arm 296 in the direction of arrow P, thus rotating the stub shaft 288 in that same direction and, accordingly, displacing the lever 286 for moving the rod 230 in the direction of arrow Q. Thereupon, the roller shifting levers 226 and 258 associated, as hereinafter described, with the shifting rod 230, are actuated to shift their respective rollers 220 and 252 in the direction of arrow R for engagement with their corresponding active cams 222 and 254 as more clearly shown in Figure 2.

The shifting rod 230 and the various elements associated therewith and hereinafter described may be urged to their normal inactive position, that is, in the directions opposite to those mentioned, by action of any suitable means such as a spring 326 arranged on said shifting rod 230 in the manner represented, for instance, in Figure 2.

VI.—Safety mechanism

As hereinbefore mentioned, and as will be explained in detail hereinafter, the welt turning attachment is operated when the main cam shaft 12 is shifted to its narrowing position.

In order to eliminate any possibilty of a crash due to simultaneous operation of the welt turning attachment and narrowing mechanism of the knitting machine, there is provided a so-called safety mechanism which functions to lock the welt turning attachment and positively prevent its function during narrowing. In accordance with the preferred embodiment shown in the drawings, the safety mechanism includes a pin 328 on the arm 296 and a member 330 rigid with the narrowing machine lifting shaft 18. The member 330 is disposed to engage the pin 228 as shown in Figure 5 when said shaft 18 is rotated in the direction of arrow S in Figure 3, that is, in the direction to lower the narrowing machine and free the same for its operation.

Since the abutment 318 rigid with arm 296 contacts the lever 316 connected through the rotatable rod 312 and lever 310 to the shifting rod 302, it will be appreciated that accidental movement of said shifting rod in the direction of arrow J to its active position, which sets the welt turning attachment for operation, is positively prevented as long as the arm 296 is held in its inoperative position, that is, in the position shown in Figure 5, by the member 330 in engagement with the pin 328 on said arm 296.

From the foregoing description of the safety mechanism, it will be understood that the welt bar advancing and retracting mechanism, and the welt bar lifting and lowering mechanism are free to operate only when the narrowing mechanism is raised and incapable of operation, but that said welt bar mechanisms are incapable of operation when the narrowing mechanism is lowered and free to operate.

OPERATION

At the start of the machine, to begin the knitting of stocking leg blanks on the multiple sections, the machine is set with the main cam shaft 12 in knitting position, and the welt turning attachment in its neutral position so that the roller 220 of the welt bar advancing and retracting mechanism is riding on the neutral cam 224 thereof, and the roller 252 of the welt bar lifting and lowering mechanism is riding on the neutral cam 256, the roller 322 of the control mechanism being out of the path of the cam 324 on said main cam shaft.

The machine thus set is operated to form the initial course of each leg blank in the usual manner, that is, the yarn carriers 50 feed the yarns to the needles 42 which then cofunction with the sinkers and dividers 46 to kink the yarns into loops. After the formation of the initial course loops, the knitting is temporarily interrupted to permit the engagement of the welt hooks 56 with the sinker loops. For this purpose, the welt bar carrying assemblies are moved, preferably by hand, to displace the welt bar in its rectilinear horizontal forward movement towards the needles 34, that is, in the general direction of arrow C, to bring the welt hooks 96 into operative hook-up position, that is, the position shown in Figure 20, wherein the hook ends of the welt hooks penetrate slightly beyond the vertical plane of the needles and in line with the sinkers 38 at a point between said sinkers and the knockover bits 40.

The welt bars 94 are guided into their hook-up position by means of the rails 154 which, at this time, are held in a substantially horizontal plane and in a position to locate the welt hooks in line with the spaces between the needles. The advance of the welt bars into their hook-up position, of course, causes the rotation of the shaft 100 in the direction of arrow A which, in turn, causes the lifting of the roller carrying arm 208 against the action of the spring 232. Thus, after the hook-up of the welt hooks with the initial course loops has been accomplished (Figure 21) the weight of said arm 208 and the action of said spring 232 are sufficient to impart a pull to the welt bar, exerting a retracting force on the same and providing the necessary tension for the initial draw-off, excessivess in tension, however, being prevented due to the yieldability afforded by the connection spring 144.

While the hook-up is being effected, it may be found desirable to lock the welt bars temporarily in the position shown. For that purpose, there may be provided on the shaft 100 a stop 332 engageable with a manually or automatically operable latch 334 when said shaft has been rotated in the direction of arrow A in the movement of the welt bars towards the needles.

Following the hook-up, the knitting machine operates in the usual manner to knit a series of courses of welt fabric which is drawn off by the welt bar through the elements above stated coacting in the manner specified. After the knitting of said series of courses (which may be relatively few in number), and as the machine continues to knit additional welt courses, ordinary welt rods are placed on the welt fabric for engagement with the take-up mechanism of the knitting machine. Therefore, during the knitting of the remainder of the welt fabric, the draw-off tension initially provided by the retracting force exerted on the welt bar through the pull imparted thereto by the weight of the arm 208 and action of the spring 232 is replaced by the tension created by the function of the take-up mechanism. At any time prior to the completing of the welt fabric (preferably after the hook-up of the initial course of loops) the welt bar shifting mechanism may be actuated to locate the welt hooks 96 in their aligned position with respect to the needles 34 and the pedal 86 may be depressed, thus rotating the shaft 18 which lifts and locks the narrowing mechine 64, frees the arm 296 of the control mechanism and brings the arm 235 in position for activating the spring 229.

By the time the knitting has progressed to a point where the required length of fabric to form the welt is reached, the pattern chain 92 of the machine operates to actuate the shifting rod 302 which operates the link arrangement 308 causing the arm 296 to swing in line with the cam 324. This actuation of the shifting rod 28 may be utilized to operate a switch control (not shown) having the usual well known construction to set the machine into low speed, which is desired to effect the turning of the welt.

The machine continues to operate at low speed to knit the last courses of the welt fabric, whereupon the pattern chain 92 operates to actuate the main cam shaft shogging mechanism 90 to move the cam shaft 22 to its narrowing position. Accordingly, the cam 324 is brought into active engagement with the roller 322 causing the shifting of the roller 220 and 252 in the manner heretofore stated, for bringing said rollers into cooperative engagement with their respective active cams 222 and 254. Thus during the subsequent rotation of the main cam shaft 12, the cams 222 and 254 cause the function of the tension release mechanism, the welt bar advancing mechanism, and the welt bar lifting mechanism, in the manner hereinbefore specified, to turn and form the welt.

After the turning and formation of the welt, the pattern chain 92 of the machine again functions to shog the main cam shaft 12 to its knitting position and to move the shifting rod 302 back to its inactive position, thus setting the machine for the subsequent knitting of the leg portions of the blanks, which is carried out in the customary manner well known in the art.

Whenever in the knitting of the leg portions of the blanks, the main cam shaft 12 is shifted to its narrowing position, the various mechanisms of the welt turning attachment are held against operation because the shifting rods 302 and 230 remain in their inactive positions. Moreover, accidental movements of said shifting rods to their active positions are prevented because of the function of the safety mechanism, as hereinbefore described.

Manifestly, the construction shown and described herein as a possible embodiment of the invention is capable of various modifications. Therefore, any modifications coming within the scope of the subjoined claims are to be considered within the spirit of the invention.

We claim:

1. In combination with a bank of knitting needles in a flat knitting machine, a welt turning attachment comprising: a welt bar movable towards and in relation to the needles for turning and forming a welt; means for guiding the welt bar in its movement; means for adjusting said welt bar guiding means lengthwise with respect to the needles; means for adjusting said welt bar guiding means crosswise with respect to the needles; and means for adjusting said welt bar guiding means sidewise with respect to the needles.

2. In combination with a bank of knitting needles in a flat knitting machine, a welt turning attachment comprising: a welt bar movable towards and in relation to the needles for turning and forming a welt; a rail for guiding the welt bar in its movement; a block engaging said rail for free lengthwise, crosswise, and sidewise movements; means in said block for adjusting the welt bar guiding rail lengthwise with respect to the needles; other means in the block for adjusting the welt bar guiding rail crosswise with respect to the needles; and still other means in the block for adjusting the welt bar guiding rail sidewise with respect to the needles.

3. In combination with a bank of knitting needles in a flat knitting machine, a welt turning attachment comprising: a welt bar; means for supporting the welt bar; movement imparting means; and means interconnecting the welt bar supporting means and the movement imparting means and including a rigid member for positively moving the welt bar in one direction, and a resilient member for yieldably moving the welt bar in the opposite direction.

4. In combination with a bank of knitting needles in a flat knitting machine, a welt turning attachment comprising: a welt bar; means for supporting the welt bar; movement imparting means; means interconnecting the welt bar supporting means and the movement imparting means, and functioning to establish a rigid connection therebetween for movement of the welt bar in one direction, and a yieldable connection therebetween for movement of the welt bar in the opposite direction; means for guiding the welt bar in its movements; and means for adjusting said welt bar guiding means lengthwise, crosswise, and sidewise with respect to the needles.

5. In combination with a bank of knitting needles in a flat knitting machine, a welt turning attachment comprising: a welt bar; means for supporting the welt bar; movement imparting means; means interconnecting the welt bar supporting means and the movement imparting means and including a rigid member for positively moving the welt bar in one direction, and a resilient member for yieldably moving the welt bar in the opposite direction; a rail for guiding the welt bar in its movements; a block engaging said rail for free lengthwise, crosswise, and sidewise movements; means in said block for adjusting the welt bar guiding rail lengthwise with respect to the needles; other means in the block for adjusting the welt bar guiding rail crosswise with respect to the needles; and still other means in the block for adjusting the welt bar guiding rail sidewise with respect to the needles.

6. In a flat knitting machine having a needle bar, a welt turning attachment comprising: a welt bar; a mechanism including an oscillating lever operable to impart welt drawing and turning movements to said welt bar; and a linking device connecting the welt bar to said mechanism, said device including a rigid hollow member, a connection piece slidably mounted in one end of said hollow member and connected to the welt bar, a connection element slidably mounted in the other end of said hollow member and connected to said lever, and a coil spring enclosed in said hollow member and interconnecting said piece and element for relative yieldable sliding movement with respect to the rigid hollow member.

7. In a flat knitting machine having a needle bar, a welt turning attachment comprising: a welt bar; a mechanism including an oscillating lever operable to impart welt drawing and turning movements to said welt bar; and a linking device connecting the welt bar to said mechanism, said device including a rigid hollow member, a connection piece slidably mounted in one end of said hollow member and connected to the welt bar, a connection element slidably mounted in the other end of said hollow member and having means for establishing a detachable connection with said lever, and a coil spring enclosed in said hollow member and interconnecting said piece and element for relative yieldable sliding movement with respect to the rigid hollow member.

8. In a flat knitting machine having a bank of spaced needles: a welt turning attachment comprising a welt bar having a bank of spaced welt hooks disposed to move in relation to the bank of needles for the formation of welt fabrics; and a mechanism for guiding the welt bar and its hooks in their movements and including guide rails for the welt bar, a shaft slidably supported longitudinally of the machine and carrying the guide rails of the welt bar, and means associated with said shaft to slide the same for displacing said rails together with the associated welt bar to locate the welt hooks either in line with the needles or in line with the spaces between the latter.

9. In a flat knitting machine provided with a plurality of knitting sections, each section having a bank of spaced needles: a welt turning attachment comprising a welt bar for each of said knitting sections and having a bank of spaced welt hooks disposed to move in relation to the bank of needles in the associated section for the formation of welt fabrics; and a mechanism for guiding the welt bars and their hooks in their movements and including guide rails for the welt bars, a split shaft slidably supported longitudinally of the machine, one section of said split shaft extending transversely of certain of the knitting sections in the machine and carrying the guide rails for the welt bars in said certain sections, the other section of said split shaft extending transversely of the remaining knitting sections in the machine and carrying the guide rails of the welt bars in said remaining knitting sections, and means associated with said split shaft to slide its sections endwise towards and away from each other for displacing said rails together with the associated welt bars to locate the welt hooks either in line with the needles or in line with the spaces between the latter.

10. In a flat knitting machine having a narrowing mechanism including a rockable shaft placeable in position to lock said mechanism against operation: a welt turning attachment comprising a welt bar; and an operating mechanism therefor including cam means, a lever and link arrangement acted upon by said cam means and connected to the welt bar for imparting welt drawing and turning movements thereto, and means operable to impose an increased load upon said lever and link arrangement, said means being controlled through said shaft when placed in position to lock the narrowing mechanism against operation.

11. In a flat knitting machine having a narrowing mechanism and a rockable shaft movable for placing said mechanism in operative and in inoperative positions: a welt turning attachment; and means operated through the movement of said shaft to lock said attachment against operation when the shaft is moved to its position for placing the narrowing mechanism in its operative position, and to free said attachment for operation when the shaft is moved to its position for placing the narrowing mechanism in its inoperative position.

12. In a flat knitting machine, in combination a main cam shaft, a set of hooks adapted to engage the initial length of yarn laid to the needles, means operated by said main cam shaft to apply pressure to said hooks to move them rearwardly towards the needle row into position to engage said initial length of yarn, means to latch said hooks in said rearward position, and means to urge said hooks forwardly away from the needle row and adapted to act immediately upon release of said latch.

13. In a flat knitting machine, in combination a main cam shaft, a bar having horizontal hooks thereon, means for exerting pressure on said bar sufficient when unopposed to draw said bar forwardly away from the needle row, means operated by said main cam shaft whereby said pressure may be overcome to move said hooks into position to engage the initial length of yarn laid to the needles, means to latch said second means, said pressure-exerting means being adapted to apply said forward pressure to said bar immediately upon release of said latch means.

14. In a flat knitting machine, in combination a main cam shaft, means operated by said main cam shaft to move welt bars having hooks toward the needle row into position to cause said hooks to engage the yarn of the first course of a given fabric, draw-off means connected to said bars to place tension on the fabric and including a shaft and means for applying a turning movement thereto, and a latch adapted when so desired to hold said shaft against said turning movement to relieve the fabric from tension.

15. In a flat knitting machine, in combination a main cam shaft, a welt bar, a mechanism including travellers arranged to move toward and away from the needle row and to move said welt bar toward said needle row therewith, means operated by said main cam shaft for applying a forward tension to said welt bar, a lever, means operated by said lever to move the travellers and simultaneously increase the potential energy of said tensioning means, and a stationary element arranged to sustain the pull of said tensioning means when said travellers are in their extreme forward position.

16. In a flat knitting machine, in combination a main cam shaft, means for knitting a welt including a needle row, a welt bar, rails on which said bar is mounted to slide toward and away from said row, means to positively move said bar toward said row for hooking up including a rotatable lever operated by said main cam shaft, a rotatable shaft, means for transmitting a draw-off tension to said shaft, and a connection between said shaft and said lever arranged to turn the shaft oppositely from the way it turns when applying draw-off tension whenever the bar is moved toward the needle row.

17. In a flat knitting machine provided with a plurality of knitting sections each having spaced needles, the combination with a shiftable main cam shaft, a set of knitting cams, and a set of narrowing cams on the main cam shaft, a pattern chain mechanism, and means controlled by the pattern chain mechanism for shifting the main cam shaft to selectively bring the set of knitting cams and the set of narrowing cams into play to actuate the needles through one motion for knitting and through another motion for narrowing: of a welt turning attachment comprising welt bars, one for each knitting section, and having spaced welt hooks disposed to move in relation to the needles in the associated sections for the formation of welt fabrics; a mechanism operable to move the welt bars toward the needles to turn the welt fabrics and comprising a rockable shaft, linking devices connecting the welt bars to said rockable shaft, said devices including rigid hollow members, connection pieces slidably mounted in one of the ends of said hollow members and connected to the welt bars, connection elements slidably mounted in the other ends of said hollow members and having means for establishing detachable connections with said levers, and coil springs enclosed in said hollow members and interconnecting said pieces and elements for relative yieldable sliding movements with respect to the rigid hollow members; a mechanism operable to actuate the welt bar moving mechanism and comprising cam means on the main cam shaft, an arm pivotally supported adjacent said cam means, a link and lever system interconnecting said arm and the rockable shaft of the welt bar moving mechanism, and a shiftable roller carried by said arm and movable into engagement with said cam means; a mechanism operable for guiding the welt bars and their hooks in their movements and comprising guide rails for the welt bars, a sectional shaft having its sections rotatably and slidably supported longitudinally of the machine, one section of said shaft extending transversely of certain of the knitting sections in the machine and carrying the guide rails for the welt bars in said certain knitting sections, the other section of said sectional shaft extending transversely of the remaining knitting sections in the machine and carrying the guide rails for the welt bars in said remaining knitting sections; a mechanism operable to slide said sections of the sectional shaft of the welt guiding mechanism and comprising means associated with said sectional shaft to slide each section endwise in opposite directions for moving said rails together with the welt bars thereon to displace the welt hooks from a position in line with the spaces between the needles to a position in line with the needles; a mechanism operable to rock the sections of the sectional shaft of the welt bar guiding mechanism for lifting the guide rails and thus elevating the welt bars and their hooks in relation to the needles in the turning of the welt fabric, and comprising cam means on the main cam shaft for each of the sections of said sectional shaft, arms pivotally supported adjacent said cam means, link and lever systems interconnecting said arms and the corresponding sections of said sectional shaft, and shiftable rollers carried by said arms and movable into engagement with the adjacent cam means; and a mechanism operable for shifting the shiftable roller of the mechanism operable to actuate the welt bar moving means and the shiftable rollers of the welt bar lifting mechanism, and comprising shifting levers, one for each shiftable roller, a pivotal member operatively connected with said shifting levers and controlled by the pattern chain mechanism to be moved in combined right angular and longitudinal directions with respect to the main cam shaft first for placement in the path of, and then for movement with, the shifting movement of the cam shaft through the pattern control means aforesaid, whereby to transmit shifting motion to the shifting levers for shifting said shiftable rollers in synchronism with the shifting of the main cam shaft to bring the set of narrowing cams into play for actuating the needles through the narrowing motion, whereby to operate said arms and said link and lever systems for rocking the shaft of the welt bar moving mechanism to move the welt bars upwardly toward the needles in timed relation with the narrowing motion thereof.

18. In a flat knitting machine provided with a plurality of knitting sections each having spaced needles, the combination with a shiftable main cam shaft, a set of knitting cams, and a set of narrowing cams on the main cam shaft, a pattern chain mechanism, and means controlled by the pattern chain mechanism for shifting the main cam shaft to selectively bring the set of knitting cams and the set of narrowing cams into play to actuate the needles through one motion for knitting and through another motion for narrowing: of a welt turning attachment comprising welt bars, one for each knitting section, and having spaced welt hooks disposed to move in relation to the needles in the associated sections for the formation of welt fabrics; a mechanism operable to move the welt bars toward the needles to turn the welt fabrics and comprising a rockable shaft, linking devices connecting the welt bars to said rockable shaft, said devices including rigid hollow members, connection pieces slidably mounted in one of the ends of said hollow members and connected to the welt bars, connection elements slidably mounted in the other ends of said hollow members and having means for establishing detachable connections with said levers, and coil springs enclosed in said hollow members and interconnecting said pieces and elements for relative yieldable sliding movements with respect to the rigid hollow members; a mechanism operable to actuate the welt bar moving mechanism and comprising cam means on the main cam shaft, an arm pivotally supported adjacent said cam means, a link and lever system interconnecting said arm and the rockable shaft of the welt bar moving mechanism, and a shiftable roller carried by said arm and movable into engagement with said cam means; a mechanism operable for guiding the welt bars and their hooks in their movements and comprising guide rails for the welt bars, a sectional shaft having its sections rotatably and slidably supported longitudinally of the machine, one section of said shaft extending transversely of certain of the knitting sections in the machine and carrying the guide rails for the welt bars in said certain knitting sections; the other section of said sectional shaft extending transversely of the remaining knitting sections in the machine and carrying the guide rails for the welt bars in said remaining knitting sections; a mechainsm operable to slide said sections of the sectional shaft of the welt guiding mechanism and comprising means associated with said sectional shaft to slide each section endwise in opposite directions for moving said rails together with the welt bars thereon to displace the welt hooks from a position in line with the spaces between the needles to a position in line with the needles; a mechanism operable to rock the sections of the sectional shaft of the welt bar guiding mechanism for lifting the guide rails and thus elevating the welt bars and their hooks in relation to the needles in the turning of the welt fabric, and comprising cam means on the main cam shaft for each of the sections of said sectional shaft, arms pivotally supported adjacent said cam means, link and lever systems interconnecting said arms and the corresponding sections of said sectional shaft, and shiftable rollers carried by said arms and movable into engagement with the adjacent cam means; a mechanism operable for shifting the shiftable roller of the mechanism operable to actuate the welt bar moving means and the shiftable rollers of the welt bar lifting mechanism, and comprising shifting levers, one for each shiftable roller, a pivotal member operatively connected with said shifting levers and controlled by the pattern chain mechanism to be moved in combined right angular and longitudinal directions with respect to the main cam shaft first for placement in the path of, and then for movement with, the shifting movement of the cam shaft through the pattern control means aforesaid, whereby to transmit shifting motion to the shifting levers for shifting said shiftable rollers in synchronism with the shifting of the main cam shaft to bring the set of narrowing cams into play for actuating the needles through the narrowing motion, whereby to operate said arms and said link and lever systems for rocking the shaft of the welt bar moving mechanism to move the welt bars upwardly toward the needles in timed relation with the narrowing motion thereof; and a fabric take-up mechanism operable in conjunction with the welt bars to take up the welt fabrics, and comprising a wareroller shaft functioning to tension said fabrics, a gear fixed to said wareroller shaft, a toothed segment engageable with said gear, and a link connecting said segment to the pivotally supported arm of the mechanism operable to actuate the welt bar moving mechanism whereby said segment is caused to engage said gear to relieve the wareroller shaft of its fabric tensioning function simultaneously with the actuation of the welt bar moving and guiding mechanisms when actuated to move the welt bars upwardly toward the needles for turning the welt fabrics.

19. In a flat knitting machine provided with a bank of needles, the combination with a shiftable main cam shaft of a welt turning attachment comprising: a welt bar disposed to move in relation to the bank of needles for the formation of the welt; a mechanism operable to move the welt bar toward the needles to turn the welt; a mechanism operable to actuate the welt bar moving mechanism and comprising cam means on the main cam shaft, an arm pivotally supported adjacent said cam means, a link and lever system interconnecting said arm and welt bar moving mechanism, and a shiftable roller carried by said arm and movable into engagement with said cam means; and a mechanism operable for shifting the shiftable roller and comprising a shifting lever engaging said roller, a pivotal member operatively connected to said shifting roller and mounted to be moved in combined right angular and longitutdinal directions with respect to the main cam shaft first for the placement of, and then for movement with, the shifting movement of the main cam shaft to transmit shifting motions to the shifting lever for shifting said shiftable roller.

20. In a flat knitting machine provided with a bank of needles, the combination with a shiftable main cam shaft of a welt turning attachment comprising: a welt bar disposed to move in relation to the bank of needles for the formation of the welt; a mechanism operable to move the welt bar toward the needles to turn the welt; a mechanism operable to actuate the welt bar moving mechanism and comprising cam means on the main cam shaft, an arm pivotally supported adjacent said cam means, a link and lever system interconnecting said arm and welt bar moving mechanism, and a shiftable roller carried by said arm and movable into engagement with said cam means; a mechanism operable for shifting the shiftable roller and comprising a shifting lever engaging said roller, a pivotal member operatively connected to said shifting roller and mounted to be moved in combined right angular and longitudinal directions with respect to the main cam shaft first for the placement of, and then for movement with, the shifting movement of the main cam shaft to transmit shifting motions to the shifting lever for shifting said shiftable roller; and a fabric take-up mechanism operable in conjunction with the welt bar to take up the welt and comprising a wareroller shaft functioning to tension the welt, a gear fixed to said wareroller shaft, a toothed segment engageable with said gear, and a link connecting said segment to the pivotally supported arm of the mechanism operable to actuate the welt bar moving mechanism whereby said segment is caused to engage said gear to relieve the wareroller shaft of its tensioning function simultaneously with the actuation of the welt bar moving mechanism when actuated to move the welt bar toward the needles for turning the welt.

21. A welt bar set-up mechanism for a flat knitting machine comprising: a movable support for the welt bar; a pair of slidably connected rigid members for rigidly and positively moving the support in one direction; and a spring resiliently connecting said members together whereby said members may yieldably move the support in the opposite direction.

22. A welt bar set-up mechanism comprising, in combination with a welt bar: rails supporting the welt bar in its set-up movements; a pair of rigid connectors attached to the end portions of the welt bar; a pair of rigid tubular sections having limited adjustable sliding connections with said connectors; coil springs housed within said sections and yieldably connecting said connectors to said sections whereby the sections and connectors may yieldably move relative to each other; a rotatable shaft; and arms connecting said shaft to said tubular sections whereby rotation of the shaft in opposite directions moves the welt bar in opposite directions on said rails.

23. A welt bar set-up mechanism for a flat knitting machine having a cam shaft comprising, in combination with a belt bar: a support for guiding the welt bar in its set-up movements; and a pair of devices for movement of the welt bar along said support and each consisting of a tubular section, a connector slidably supported by said section and connected to the welt bar, a coil spring within said section and having one end attached to the section and its other end attached to said connector, a shaft, an arm connected to said shaft and detachably connected to said tubular section, a lever connected to said shaft, a pivotally mounted second lever, a spring operatively engaging said second lever, a link operatively connecting said levers together, a roller adjustably connected to said second lever, a neutral cam and an active cam mounted on the main cam shaft of the machine and cooperatively associated with said roller, and pattern mechanism for selectively shifting said roller into operative engagement with said neutral and active cams.

24. Welt turning apparatus for a full fashion knitting machine comprising a welt bar carrying a plurality of welt points, mechanical means operated by the knitting machine to urge the welt bar toward or away from the needles, guide arms for supporting the welt bar in its movement toward or away from the needles, a pivotal mounting for said guide arms permitting their up or down movement and also permitting their lateral movement, other mechanical means operated by the knitting machine to turn the guide arms about said pivotal mounting and determine the up or down position of said guide arms, means fixing the position of said welt bar endwise between said guide arms, and another mechanical means operated by the knitting machine to impart a lateral movement to the guide arms and thereby move the welt bar endwise a half needle space to permit free passage of the points between the needles.

25. In combination with a bank of knitting needles in a flat knitting machine, a welt forming attachment comprising: a welt bar; means for supporting the welt bar; movement imparting means, and means interconnecting the welt bar supporting means and the movement imparting means and including a rigid member for positively moving the welt bar in one direction, and a resilient member for yieldably moving the welt bar in the opposite direction.

26. In a flat knitting machine having a needle bar, a welt forming attachment comprising: a welt bar; a mechanism including an oscillating lever operable to impart movements to said welt bar; and a linking device connecting the welt bar to said mechanism, said device including a rigid hollow member, a connection piece slidably mounted in one end of said hollow member and connected to the welt bar, a connection element slidably mounted in the other end of said hollow member and connected to said lever, and a coil spring enclosed in said hollow member and interconnecting said piece and element for relative yieldable sliding movement with respect to the rigid hollow member.

27. In a flat knitting machine having a needle bar, a welt forming attachment comprising: a welt bar; a mechanism including an oscillating device operable to impart movements to said welt bar; and means connecting the welt bar to said mechanism, said means including a rigid hollow member, a connection piece slidably mounted in one end of said hollow member and connected to the welt bar, a connection element slidably mounted in the other end of said hollow member and having means for establishing a detachable connection with said lever, and a coil spring enclosed in said hollow member and interconnecting said piece and element for relative yieldable sliding movement with respect to the rigid hollow member.

28. In a flat knitting machine, in combination, a main cam shaft, a row of knitting needles operable by said shaft, a welt bar having hooks and movable toward and from said needle row, means operable by said main cam shaft for operating said welt bar, draw-off means for placing under tension fabric knitted by said needles and including a shaft and means for imparting a turning movement thereto, and means for preventing the turning of said shaft last named and thereby relieving the fabric from the action of said draw-off means.

29. Welt turning apparatus for a full fashioned knitting machine comprising a welt bar carrying a plurality of welt points, mechanical means operable by the knitting machine to move the welt bar relatively to the needles of the knitting machine, guide arms for supporting the welt bar during its movements toward or away from said needles, a pivotal mounting for said guide arms permitting their up and down movement and also permitting their lateral movement, other mechanical means operable by the knitting machine for turning the guide arms about said pivotal mounting and determining the up or down position of said guide arms, means fixing the position of said welt bar endwise between said guide arms, and other mechanical means operable by the knitting machine for imparting lateral movement to the guide arms and thereby moving the welt bar endwise a half needle space to permit free passage of the welt points between said needles.

ALFRED HOFMANN.
DONALD G. TRUTNER.
FRIEDRICH MAX WACHTLER.